Oct. 6, 1964   F. W. JOHNSON   3,152,312
TEMPERATURE COMPENSATED INDUCTOR
Filed Dec. 12, 1961
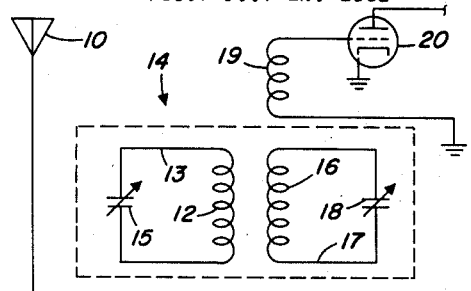
FIG 1
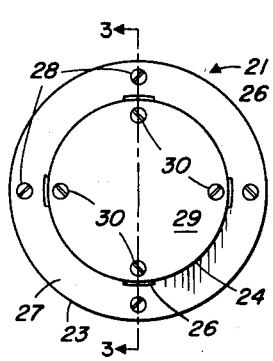
FIG 2
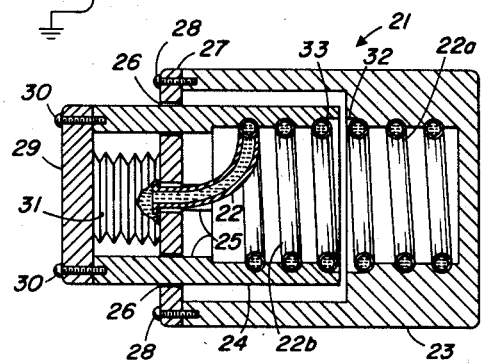
FIG 3
FIG 5   FIG 4
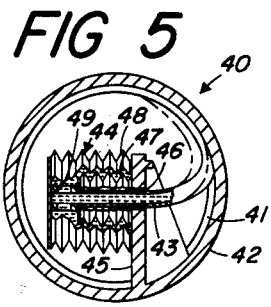
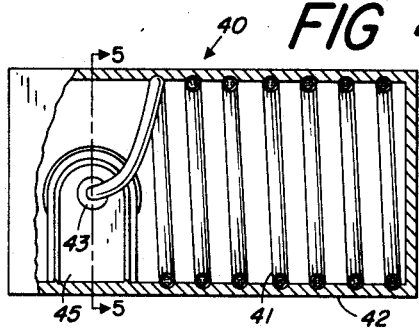
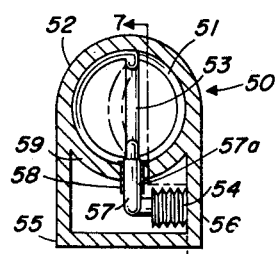
FIG 6
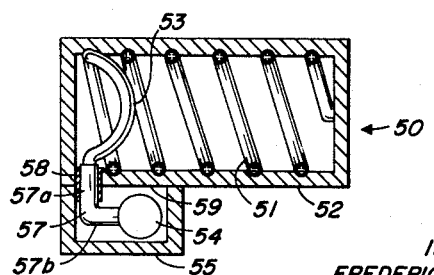
FIG 7
INVENTOR
FREDERICK W. JOHNSON
BY
ATTORNEYS

United States Patent Office 3,152,312
Patented Oct. 6, 1964

3,152,312
TEMPERATURE COMPENSATED INDUCTOR
Frederick W. Johnson, Cedar Rapids, Iowa, assignor to Collins Radio Company, Cedar Rapids, Iowa, a corporation of Iowa
Filed Dec. 12, 1961, Ser. No. 160,399
6 Claims. (Cl. 336—179)

This invention relates to temperature compensation for coils and is particularly concerned with stabilizing the inductance of a coil as its size varies with temperature change, and is especially suited for precise temperature compensation with high Q coils.

Coils supported by insulating materials in a conventional manner, generally expand in diameter with increasing temperature. This coil diameter increase is substantially a function of the expansion coefficient of the coil metal. The insulating material of a coil case or support is generally quite pliable and does very little to inhibit such temperature change induced coil diameter change. A coil also tends to grow in length with increasing temperature, but this is dominated to a much greater degree, substantially completely, by the insulating material of the coil case. Such restraint of length increase is an inherent feature of coils since they generally are not as stiff axially as they are radially.

Hence, inductance of a coil is influenced more by temperature induced diameter change than it is by correspondingly induced length change. With coil temperature increase, the inductance increases, as substantially a direct function of expanding coil diameter. In order to compensate for this, there must be a change in coil diameter equal to and opposite to the amount of temperature induced diameter change. Increasing the length of the coil is another method that may also be used for offsetting coil inductance change caused by temperature induced coil diameter growth.

Various coil constructions and cooperating temperature sensing devices have been used for changing coil length and/or diameter, in efforts to compensate for inductance change with temperature induced coil size changes. These have proven reasonably successful for many coil uses where any temperature gradient that may be encountered between a coil and a temperature sensor does not result in material corrective temperature compensating error. But what is immaterial for inductance correction with many low Q coils is a problem and becomes quite material for high Q coils used in high Q circuits. Temperature gradients between coil and sensor must be minimized if not substantially eliminated for accurate inductance temperature compensation with high Q coils.

It is therefore, a principal object of this invention to substantially eliminate any temperature gradient between a coil and the temperature sensor used for controlling coil shape and inductance in compensating for temperature induced coil shape and inductance change.

Another object is to substantially unify the coil and the temperature sensor in the coil.

Features of this invention useful in accomplishing the above objects include a coil formed from tubing, a bellows conected to one end of the coil, and a fluid, having a high coefficient of thermal expansion, filling both the tubing forming the coil and also the bellows. Expansion of the fluid and the resulting expansion of the bellows is applied through suitable structural means for altering the shape of the coil to thereby control inductance of the coil. One embodiment features two separate coil sections which may be moved axially with respect to each other by expansion and contraction of the bellows. In alternate embodiments motion of the bellows is applied to vary the diameter of the last turn of the coil, or to rotate the last half turn as a variometer, thus changing total inductance just enough to offset the temperature induced change.

The invention is quite flexible in that the choice of a fluid for a desired thermal expansion rate, bellows size, bellows to coil linkage structure, coil section size, and other such design variables offer many alternate possibilities for obtaining very precise temperature compensation. Motion of the bellows may be applied to a component other than the inductor in a circuit of a non-isothermal system for circuit temperature compensation. However, such a requirement that the system be isothermal is eliminated where the coil compensates itself, as with the embodiments hereinafter described, without regard to temperature of associated components.

Specific embodiments representing what are presently regarded as the best modes of carrying out the invention are illustrated in the accompanying drawing.

In the drawing:

FIGURE 1 represents a high-Q coupling system used for coupling a radio frequency input to an antenna to the first R.F. stage of a receiver wherein the high Q coils used must be substantially free of temperature variation induced inductive drift;

FIGURE 2, an end view of a coil case;

FIGURE 3, a sectioned view taken substantially from line 3—3 of FIGURE 2 showing internal detail of a self-temperature compensating coil structure that may be used for a high Q coil in the high Q circuit of FIGURE 1;

FIGURE 4, a partially broken away end section view of another high Q coil embodiment;

FIGURE 5, a sectioned view taken from line 5—5 of FIGURE 4;

FIGURE 6 is a broken away end section view of another temperature compensated high Q coil; and FIGURE 7, a side section view taken substantially from line 7—7 of FIGURE 6.

Referring to the drawings:

Radio frequency signals received by antenna 10 are passed to a coil 11 connected between antenna 10 and ground. The R.F. signal is inductively coupled from coil 11 to high Q coil 12 of the tunable subcircuit 13 in multicoupler coil circuit 14. Sub-circuit 13 includes a tunable capacitor 15 and is inductively coupled to high Q coil 16 of tunable sub-circuit 17. The sub-circuit 17, including a tunable capacitor 18, is also a part of multicoupler coil circuit 14. High Q coil 16 is, in turn, inductively coupled to a coil 19 connected between ground and the control grid of the first R.F. stage 20 in a radio receiver.

A temperature self-compensating coil structure 21, as shown in FIGURES 2 and 3, may be used for the high Q coils 12 and 16 of FIGURE 1. This embodiment utilizes a coil 22 of tubular conductive material containing a high expansion rate fluid. Although coil 22 is a one-piece continuous coil it may be considered to have a portion 22a mounted in a case 23 made of insulating material and a portion 22b supported by a case section 24 also made of insulating material. Case section 24 has axially extended projections 25 which extend through and are slidably supported in the openings 26 in end plate 27 of case 23. This provides for relative axial movement between case 23 and case section 24.

End plate 27 is mounted by screws 28 at an end of case 23 for assembly purposes, and the end plate 29 of case section 24 is fastened to projections 25 by screws 30. Bellows 31 is mounted between case plate 27 and plate 29 and moves case section 24 to lengthen or shorten coil 22 by expansion and contraction, respectively, of bellows 31. Case section 24 is resiliently urged inwardly by the resilient force of the coil turn between coil portions 22a and 22b. Bellows 31 may also be bonded by conventional means to both plates 27 and 29 to further insure that the plates are drawn closer together and effectively shorten coil 22 as the bellows contracts.

The tubular turns of coil 22 and the bellows 31 are filled with a fluid, advantageously, a high expansion rate fluid which is in free fluid communication between the coil and the bellows. Temperature change, increasing or decreasing, of the coil and the fluid acts to expand or contract the bellows. Among the fluids suitable for use in temperature self-compensated inductor 21 is Monsanto chemical OS–45, manufactured by the Monsanto Chemical Company. The coefficient of thermal expansion with this chemical is approximately $8 \times 10^{-4}$ per degree centigrade, and since it has a bulk modulus of approximately 75% of the modulus of water it can be counted on to provide the mechanical work required for moving case section 24 relative to case 23. An interior portion at 32 in case 23 is removed and an interior portion at 33 in case section 24 is removed. This provides for a greater portion of coil 22 to flex than for only a small portion between coil portions 22a and 22b to absorb the flexing imposed with axial expansion and contraction of the coil.

In the embodiment of FIGURES 4 and 5, a temperature self-compensating coil structure 40 features a coil 41 of tubular conductive material contained within a case 42 made of insulating material. The end 43 of the last turn of coil 41 extends into and through bellows structure 44. Bellows 44 is a double walled bellows structure mounted at one end within casing 42 on internal casing bracket 45. The coil end 43 extends through opening 46 in bracket 45, through the bellows, and is fastened to the far end of bellows 44. The high expansion rate fluid used fills the tubular coil and the inside of the bellows between inner wall 47 and outer wall 48. Openings 49 provide for free fluid communicaiton between tubular coil 41 and the interior of bellows 44. Expansion of the fluid consistent with increasing coil temperature expands bellows 44. Thus, the bellows 44 sucks the coil end 43 further into the bellows thereby reducing total coil length and also reducing the diameter of the last coil turn. This results in a coil inductance compensating change just enough to offset inductance increase from temperature induced diameter growth of coil 41.

Referring now to the embodiment of FIGURES 6 and 7, temperature self-compensating coil structure 50 features a coil 51 of tubular conductive material contained within a case 52 made of insulating material. With this embodiment, however, the last half turn 53 of coil 51 is arranged for pivotal movement back and forth through an orientation substantially at right angles to the other turns of the coil. This pivotal movement of coil half turn 53 which projects axially into coil 51 is controlled by bellows 54 also contained within case 52. The bellows 54 is mounted within a compartment 55 of case 52 to act between compartment wall 56 and a relatively stiff tubular lever extension 57 connecting the last half turn 53 to bellows 54. Lever extension 57 is substantially L shaped with the upright portion 57a of the L, as seen in FIGURE 7, rotatably journaled in a bearing 58 mounted in the compartment wall 59 of case 52. The other portion 57b of the L is fastened to one end of bellows 54 to act as a lever in converting expansion and contraction of the bellows 54 into pivotal movement of the lever extension 57 about the axes of its journal mounting in bearing 58.

The tubular turns of coil 51, the tubular lever extension 57, and the bellows 54 are filled with a fluid, advantageously, a high expansion rate fluid which is in free fluid communication throughout the coil, lever extension, and the bellows. Thus, for example, increasing temperature from a nominal coil 51 temperature, consistent with the coil half turn 53 position shown, will expand the fluid and thereby expand bellows 54. The expansion of bellows 54 will move coil half turn 53 toward an operational position, such as indicated in phantom in FIGURE 6. Operation with increasing and decreasing temperature and the resulting expansion and contraction of the bellows 54 rotates the last half turn 53 as a variometer, thus changing total inductance just enough to offset the temperature induced change. Such rotation of the coil half turn, simply stated, added to or subtracts, depending on the direction of rotation, from the total inductance to offset temperature change induced coil 51 diameter change.

Thus, from the foregoing description it will be seen that improved, relatively inexpensive, reliable, and quite accurate temperature self-compensating coil structures are provided using a high expansion rate fluid temperature sensor within the tubular turns of such coils. The fluid used as the temperature sensor must have a relatively high coefficient of thermal expansion and a bulk modulus sufficient to provide the mechanical work required in expanding a bellows, also filled with the fluid, and deforming the coil in precisely compensating for temperature change induced coil diameter variations and the resulting coil inductance changes. The mechanical work obtained by such a fluid in expanding a bellows, in fluid communication with the tubular turns of the coil, could be applied to a component other than the inductor in a circuit of an isothermal system for circuit temperature compensation. In the temperature self-compensating coil structures as disclosed above, the fluid temperature sensor is contained directly within the tubular turns of the coil itself and, therefore, reacts directly to the temperature of the coil itself. Thus, temperature gradient between a coil and its temperature sensor is substantially eliminated and the temperature sensor fluid itself provides the force and the work required, through bellows connected to the coil, for controlling coil shape and inductance in compensating for temperature induced coil change and inductance change. Further, should there be variations in temperature between various portions of a coil the corresponding volumetric variations of the respective portions of sensor fluid tend to integrate to provide proper compensation for the coil.

Whereas this invention is here illustrated and described with respect to several specific embodiments thereof, it should be realized that various changes may be made without departing from the essential contribution to the art made by the teachings hereof.

I claim:

1. In an electrical circuit having a coil with turns formed from electrically conductive tubing; a temperature sensing fluid having a high thermal expansion rate contained within said tubing, temperature sensing fluid containing means open to the interior of said tubing for free fluid communication of said fluid between the tubing and said fluid containing means, said fluid containing means being capable of physical size variation responsive to volumetric variation of said temperature sensing fluid with temperature sensing by said fluid; and said fluid containing means being connected to a component of said isothermal electrical circuit for physically altering said component and compensating for temperature induced inductance change of the circuit.

2. The electrical circuit of claim 1, wherein said fluid containing means is a bellows connected to one end of said coil, with said fluid sensor filling the tubular turns of said coil and said bellows, and means for translating physical volumetric variation of said bellows to correspondingly controlled shape variation of the coil to compensate for temperature change induced coil diameter variations.

3. In a temperature self-compensating coil structure, a coil having turns formed from electrically conductive tubing, a bellows connected to one end of said tubing, a temperature sensing and thermally expansible fluid filling both the tubular turns of the coil and said bellows said bellows, mounting means for said coil, said mounting and in free fluid communication between said coil and means including a first section and a second section with both sections constructed for relative movement between said sections, said first and second mounting means sections being connected to different axially spaced portions of said coil, and said bellows being connected to both said first and second mounting means for controlling the relative movement between said first and second sections of the mounting means and for controlling the axial length of said coil to compensate for temperature change induced coil diameter change.

4. The temperature self-compensating coil structure of claim 3, wherein said temperature sensing fluid has a relatively high coefficient of thermal expansion and the bulk modulus sufficient for the mechanical work required in expansion and contraction of the bellows and the bellows controlled coil length variations.

5. In a temperature self-compensating coil structure, a coil having turns formed from electrically conductive tubing, a bellows connected to one end of said coil, a temperature sensing and thermally expansible fluid filling both the tubular turns of the coil and said bellows and being in free fluid communication between said coil and said bellows, mounting means for both said coil and said bellows, said mounting means including a bracket mounting one end of said bellows, said bellows being of a double generally concentric walled bellows construction with a center opening, a portion of the end of said coil tubing extending through an opening in said bracket, an end of the bellows, through the center opening of the bellows, and being connected to the far end of said double walled bellows, wherein as the temperature sensing fluid expands with increasing temperature of the coil the bellows expands and draws an increasing portion of the last coil turn into the bellows reducing total electronically effective coil length and reducing last coil turn diameter to compensate for temperature increase induced coil diameter growth.

6. In a temperature self-compensating coil structure, a coil having turns formed from electrically conductive tubing, a bellows connected to one end of said tubing, said coil having a last turn portion arranged for pivoted movement back and forth through an orientation substantially at right angles to the other turns of the coil, said tubing including a lever extension between said bellows and said last turn portion, mounting means for both said coil and said bellows, bearing journal means for said lever extension in said mounting means, a temperature sensing fluid filling the tubular turns of the coil, said lever extension, and the bellows, said temperature sensing fluid being in free fluid communication between said coil and said bellows through said lever extension, and said temperature sensing fluid being a fluid having a sufficient high coefficient of thermal expansion and a bulk modulus for the mechanical work required; said tubing, lever extension, and bellows being so interconnected and mounted that the degree of expansion of the bellows determines the rotational position of said last turn portion of the coil as a variometer in varying total coil inductance in offsetting other temperature induced coil size changes.

References Cited in the file of this patent

UNITED STATES PATENTS

| | | |
|---|---|---|
| 1,891,481 | Scofield | Dec. 20, 1932 |
| 2,588,304 | Storm | Mar. 4, 1952 |

UNITED STATES PATENT OFFICE
CERTIFICATE OF CORRECTION

Patent No. 3,152,312

October 6, 1964

Frederick W. Johnson

It is hereby certified that error appears in the above numbered patent requiring correction and that the said Letters Patent should read as corrected below.

Column 4, lines 73 and 74, strike out "said bellows, mounting means for said coil, said mounting and in free fluid communication between said coil and" and insert instead -- and in free fluid communication between said coil and said bellows, mounting means for said coil, said mounting --; column 6, line 19, for "sufficient" read -- sufficiently --.

Signed and sealed this 29th day of December 1964.

(SEAL)

Attest:

ERNEST W. SWIDER
Attesting Officer

EDWARD J. BRENNER
Commissioner of Patents